Nov. 29, 1949  H. LIEBERHERR  2,489,910
APPARATUS FOR THE OPERATING OF
INTERNAL-COMBUSTION ENGINES

Filed May 25, 1945  2 Sheets-Sheet 1

INVENTOR
Hans Lieberherr
BY
Pennie, Davis, Marvin & Edmonds
ATTORNEYS

Nov. 29, 1949 H. LIEBERHERR 2,489,910
APPARATUS FOR THE OPERATING OF
INTERNAL-COMBUSTION ENGINES
Filed May 25, 1945 2 Sheets-Sheet 2

INVENTOR
Hans Lieberherr
BY
Pennie, Davis, Marvin & Edmonds
ATTORNEYS

Patented Nov. 29, 1949

2,489,910

UNITED STATES PATENT OFFICE 2,489,910

APPARATUS FOR THE OPERATING OF INTERNAL-COMBUSTION ENGINES

Hans Lieberherr, Winterthur, Switzerland, assignor to Sulzer Freres, Societe Anonyme, Winterthur, Switzerland Application May 25, 1945, Serial No. 595,841
In Switzerland August 18, 1944

10 Claims. (Cl. 60—97)

This invention relates to a method of operating two or more internal combustion engines driving one or more common propellers, which engines may be coupled or uncoupled singly or in groups at part load, and to an improved arrangement of apparatus for carrying out the method. In accordance with the invention, for the engines driving the propeller there is always provided a definite position of the end of delivery of the fuel pumps, which when a larger number of the engines coupled is earlier than when a smaller number of the engines is coupled, for the purpose of keeping the moment of firing within limits favourable for ignition and pressure formation, independently of the number of engines being used to drive the propellers. The invention provides an arrangement of apparatus suitable for use in the method of the invention in which each engine is operatively connected to means for altering the end of delivery of the fuel pumps step by step in accordance with the number of engines working together on or driving the propellers.

The invention provides means to effect the regulation of output of the coupled engines, after the coupling-uncoupling phase, by adjusting only the beginning of delivery of the fuel pumps. The end of delivery of the fuel pumps can be fixed by the coupling device and the beginning of delivery can be influenced by a regulating system operated by hand and/or dependent on the speed of the engines. With the coupling device the beginning and the end of delivery may be moved in time in the same direction, so that the position of the fuel lever gives a measure for the delivery quantity of the fuel pumps. In the case of the engines working on the propellers, the beginning of delivery may be regulated in dependence on the output, while in the case of uncoupled engines running at constant speed the beginning of delivery is kept constant and the end of delivery regulated in dependence on the output. In plants with Diesel-electric drive, the invention provides for the regulation of output in the case of the uncoupled engines running at constant speed independently of the propeller drive to be effected, with constant beginning of delivery, only by a change in the end of delivery. It is then possible to adjust the beginning of delivery of the fuel pumps for the uncoupled engines automatically or by hand into the position required for service at constant speed.

Suitable means are provided, such as a lever, for adjusting the end of delivery of the fuel pumps for each engine. Further, means are provided through which the adjustment of the end of delivery of the fuel pumps of several or all of the engines is so combined that, while any engine can be coupled and uncoupled as desired, the necessary adjustment of the end of delivery in the case of the engines driving the propellers is assured. The apparatus for adjusting the end of delivery of the fuel pumps may be functionally connected to the apparatus for disconnecting single engines from the engine or engines driving the propellers. The invention advantageously provides means which transmit the effect of the single coupling and uncoupling movements, performed as desired, as a whole to the adjusting members for the end of delivery of the fuel pumps of the engines retained for driving the propellers. Near the adjusting members positively connected to the coupling members is provided an adjusting member independent of these and acting upon the end of delivery of the fuel pumps of all engines engaged in the propeller drive, whereby the end of delivery can be adapted to a changing characteristic of the ship's resistance, such as presents itself in tugs and ice-breakers.

In a ship's engine which drives its propeller direct or by means of electric transmission members through a gear, it is known to effect the delivery of the fuel quantity with a constant end of delivery at all conditions of loading, this being brought about for instance in that the fuel delivery stops at the top point of the cam of the fuel pump. The adjustment of the fuel quantity required for regulating the output of the propelling engine is then effected by the suction valve of the pump being held open for a longer or shorter period, i. e., by the beginning of delivery being adjusted. Accordingly at full load there will be a greater delivery angle, corresponding to the greater delivery quantity, and this angle will be decreased at part load as the beginning of delivery moves in time nearer to the end of delivery.

As, however, the pressure wave on the one hand requires a certain time to cover the distance between the fuel pump and the injection valve, and on the other hand moves more slowly at low load of the ship's engine, these influences balance each other to a large extent with regard to the movements of the fuel valve. The beginning of fuel injection into the engine cylinders does not undergo any essential change, so that it takes place, even under very different loading conditions, always approximately at the outer dead center, at which the maximum temperatures and maximum pressures in the cylinders offer the best conditions for faultless ignition.

Unfavorable conditions of fuel injection cannot present themselves in practical service in marine propulsion plants in which several engines work upon the propeller shafts, for instance through gears or electric transmission members. In such plants there is in part load service a need dictated by economic considerations to uncouple single engines from the plant in order to stop them or to employ them separately for other purposes, for instance for the generation of electric current for general purposes. Such uncoupling means that the engines which continue to ensure the propulsion of the vessel are more heavily loaded, supposing that the vessel's speed ordered is to remain unchanged. This increased load demands a corresponding increase of the fuel pump filling for the engines in question and thus an earlier setting of the beginning of injection (moment of injection). Such a moving forward of this moment is, however, undesirable, since the injection takes place at a time when the cylinder loading has not yet reached the full compression temperature and the full compression pressure.

According as the fuel ignites more or less easily, its ignition lag is then correspondingly greater than in normal service, so that after this lag period has passed, a sudden ignition of the whole fuel quantity injected in the meantime takes place. Such an ignition brings about an almost instantaneous increase in pressure in the combustion space, and leads to harsh running of the engine and the high loading of the bearings and the driving mechanism. If, on the other hand, the ignition takes place before the upper dead center of the piston, the pressure in the combustion space rises as a result of the commencement of combustion at the same time as the compression space is diminished by the movement of the piston continuing towards the upper dead center, whereby maximum pressures of inadmissibly high value occur.

There is also a need, in particular in Dieselelectric plants, to be able to employ uncoupled engines, independently of the ship's propulsion, as current generators for general purposes, in which case their service is desirable at a constant speed controlled by a governor. In such cases it is advantageous for output regulation to keep the beginning of delivery constant to correspond to the constant service speed and only to adjust the end of delivery in relation to the former. With the present invention, these requirements can be fulfilled, economy in service increased and quiet running of the engines obtained. A further advantage can be achieved with the present invention in that all the regulating functions are carried out at the fuel pumps themselves so that no control members and complicated regulating linkages are necessary at the fuel valves.

Embodiments of the invention are shown on the attached drawings in diagrammatic form:

Figure 1:
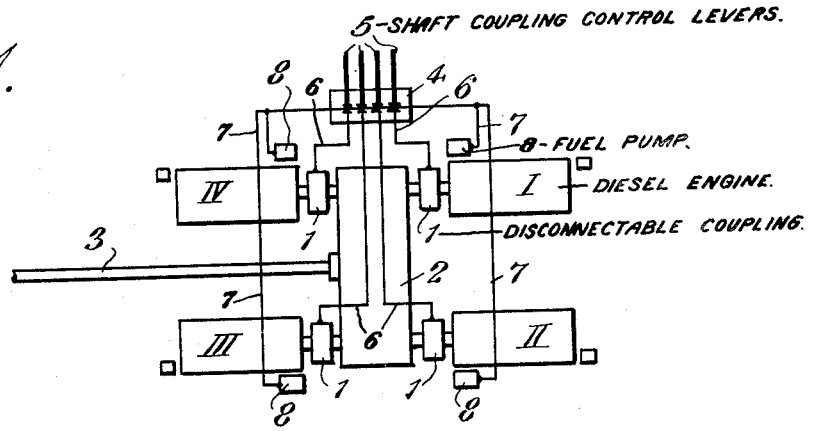
Fig. 1 shows a general view of one arrangement of apparatus.

In Fig. 1 the internal combustion engines I, II, III, IV are each coupled through a coupling 1 to a central gear 2 to which are connected one or more propeller shafts 3. On the control panel 4 a coupling switch lever 5 is provided for each of the driving engines I—IV, and by means of these levers the couplings can be engaged and disengaged through the transmission members 6, so that when small power is required for the propulsion of the ship, single engines or groups of engines can be uncoupled, or similarly, when a greater propulsion power is needed, can be coupled. From the coupling switch levers 5 transmission members 7 lead to the fuel pumps 8 provided for each of the engines I—IV, the delivery of the pumps being controlled in accordance with the two switch positions of the coupling levers 5.

Figure 2:
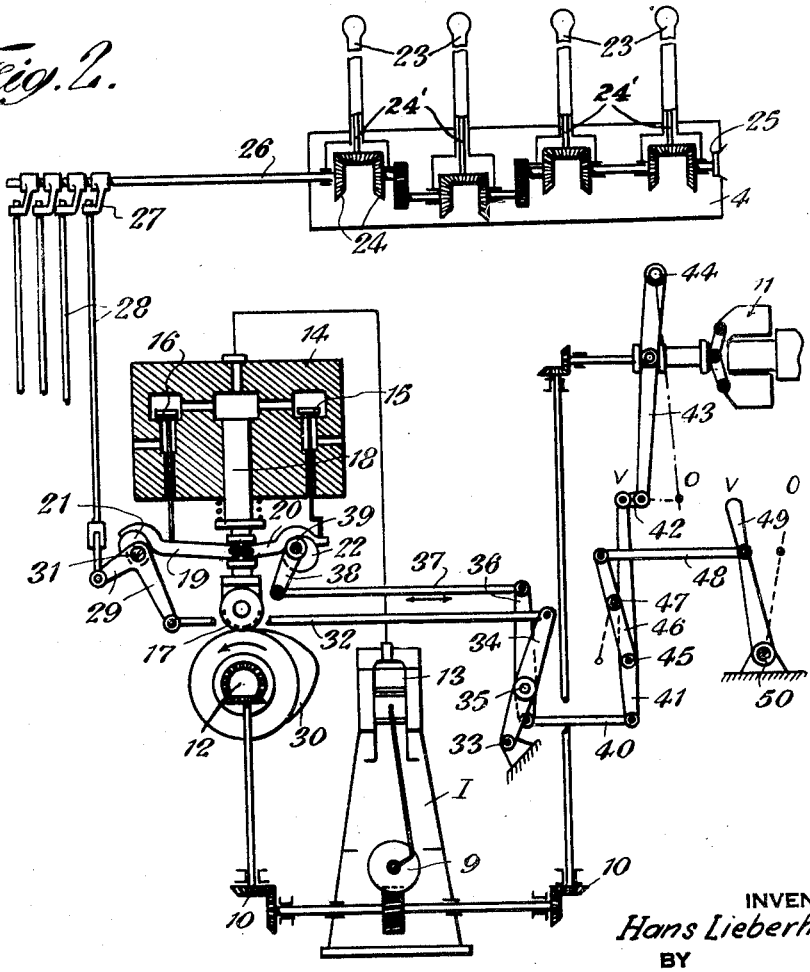
Fig. 2 is a side view of the apparatus of Fig. 1 shown in greater detail.

In Fig. 2 the conditions for a single engine of the engines I—IV shown in Fig. 1 are represented in more detail. The centrifugal governor 11 and the camshaft 12 are driven from the working shaft 9 through a gear 10. The cams 30 arranged on this camshaft 12 drive the fuel pump 14 provided for each combustion cylinder 13. The pump 14 is equipped with a suction valve 15 and with an overflow valve 16. Between the pump plunger 18 and the fuel pump roller 17, one end of the control levers 19 and 20 is inserted. The single-armed lever 19 which controls the movements of the overflow valve 16 is supported on the eccentric 21, while the double-armed lever 20 which controls the movements of the suction valve 15 is arranged on the eccentric 22. The place at which the suction valve 15 lies upon the control lever 20 is on the lever arm lying opposite to the pump plunger 18, which arm consequently performs a motion in the opposite direction to the pump plunger 18.

On the control panel 4 are arranged the switch levers 23, each of which is provided for one of the driving engines I—IV and which are individually positively connected to the corresponding coupling levers 5 or to the stopping levers of the engines, or can be joined to these. The switch levers 23 act upon a system of planet wheels 24, whose shaft end 25 is held stationary. Any adjustment of one or several switch levers 23 brings about a turning of the shaft 26, and the switch movements of the levers 23 are cumulative in any order. Arranged on the shaft 26 are four cranks 27, to each of which is attached a transmission rod 28 leading to the single engines I—IV. The rod 28 is linked to one arm of the bell-crank 29, which is attached to the shaft 31 provided with the eccentric 21. The second arm of the bell-crank 29 is linked to the transmission rod 32, which in its turn is linked to the lever 34, which can be swung about the fixed pivot 33. The lever 34 is attached to the movable pivot 35 of the double-armed lever 36. One arm of the lever 36 is connected through a transmission rod 37 to the lever 38, which is attached to the eccentric shaft 39 equipped with the eccentrics 22. The other arm of the lever 36 is connected through a rod 40 to the lever 41, which is linked through the double joint 42 to the collar lever 43 of the governor 11. The collar lever 43 is mounted on the stationary pivot 44. On the lever 41 is the linkage pin 45, to which the double-armed lever 46 is linked, this lever being movable about the stationary pivot 47. The lever 46 is connected through the rod 48 to the fuel regulating lever 49, which can be swung about a stationary pivot 50.

In order to explain the method of working of the arrangement described, it is assumed that the engines I—IV are running at part load, so that the ship keeps to the speed ordered. While this speed is maintained, the engine III is now to be disengaged and the engines I, II, IV are to be correspondingly more heavily loaded, it being supposed that their mean pressure remains within admissible limits even after this increase of load. The altered distribution of load over the engines I—IV is effected in practice in this way; the fuel lever 49 of the engine III is moved gradually on to no-load and the fuel levers of the engines I, II and IV are moved in the direction of full load from O towards V in such a way that the speed ordered remains constant. Through the movement of the fuel lever 49 of the engine III the movement transmitting members 48, 46, 41, 40, 36, 37, 38 are so actuated that the suction valve 15 opens later, while the control lever 19 remains blocked by the shaft 26 and the control rod 28, so that the end of delivery is not changed. On the other hand, the fuel levers 49 of the engines I, II and IV are moved in the direction of full load (O—V), which brings about a displacement of the transmitting rod 37 to the left (Fig. 2), whereby the suction valve closes earlier and consequently the beginning of delivery is moved forward in time. In view of the fact that, in order to keep to the constant speed of the vessel, the engines must in any case run at the same speed, the beginning of injection is consequently set earlier, which leads for a time to undesirable early ignition in the combustion cylinders and to harsh running, the correction of which is brought about by means of the invention.

The engine III turning under no-load is now disengaged from the other engines, to which end the switch lever 23 belonging to it is moved into the disengaged position. This movement effects a turning of the shaft 26 and a longitudinal displacement of the rod 28 in a downward direction, whereby the bell crank 29 performs a rotary movement in an anti-clockwise direction. The eccentric 21 turning with the shaft 31 causes the control lever 19 to drop on its left side, as a result of which the end of fuel delivery takes place at a later point in time. The displacement of the connecting rod 28 downwards brings about a displacement of the rod 32 to the right, whereby the singe-armed lever 34 performs a movement in a clockwise direction about the pivot 33. Thus the joint 35 is displaced to the right, so that the lever 36 performs a rotary movement in a clockwise direction and the rod 37 a longitudinal movement to the right. The eccentric 22 displaces the middle point of support of the control lever 20 upwards, which has the result that the suction valve 15 closes later and thus sets the beginning of delivery and of injection into the combustion chamber at a later point in time when more favorable conditions prevail for ignition. The earlier setting of the moment of ignition, which presents itself for a short time during the intermediate phase, is thus corrected.

If the engine III is uncoupled from the working shaft before the no-load condition is reached, its speed will increase, as at first no reduction of fuel takes place. If the increase in speed exceeds a certain adjustable value, for instance a number of revolutions dependent on the frequency of the ship's electric supply, the centrifugal governor 11 takes effect. The collar lever 43 is then moved in a counterclockwise direction and brings about by way of the joint 42 a clockwise rotary movement of the lever 41 on the pin 45, whereby the rod 40 is displaced to the left. As the levers 23 are not moved, the rod 32 is blocked, so that the lever 36 performs a clockwise rotary movement about the pivot 35 and the rod 37 a displacement to the right. The eccentric 22 displaces the middle point of support of the control lever 20 upwards, whereby the suction valve 15 closes later and the beginning of delivery and injection is moved nearer to the end of delivery and injection, whereby a corresponding reduction in the quantity of fuel delivered takes place. In the same way the centrifugal governor comes into action if, as a result of the propeller emerging from the water, the speed of the engines switched on to the propeller shaft rises.

Figure 3:
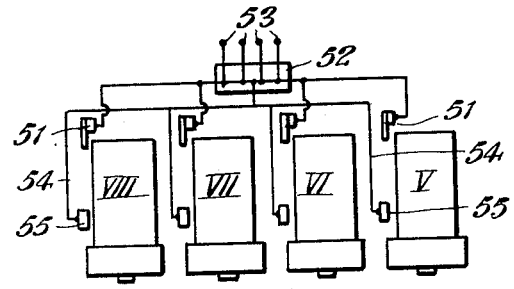
Fig. 3 is a general view of another arrangement of apparatus.
Figure 4:
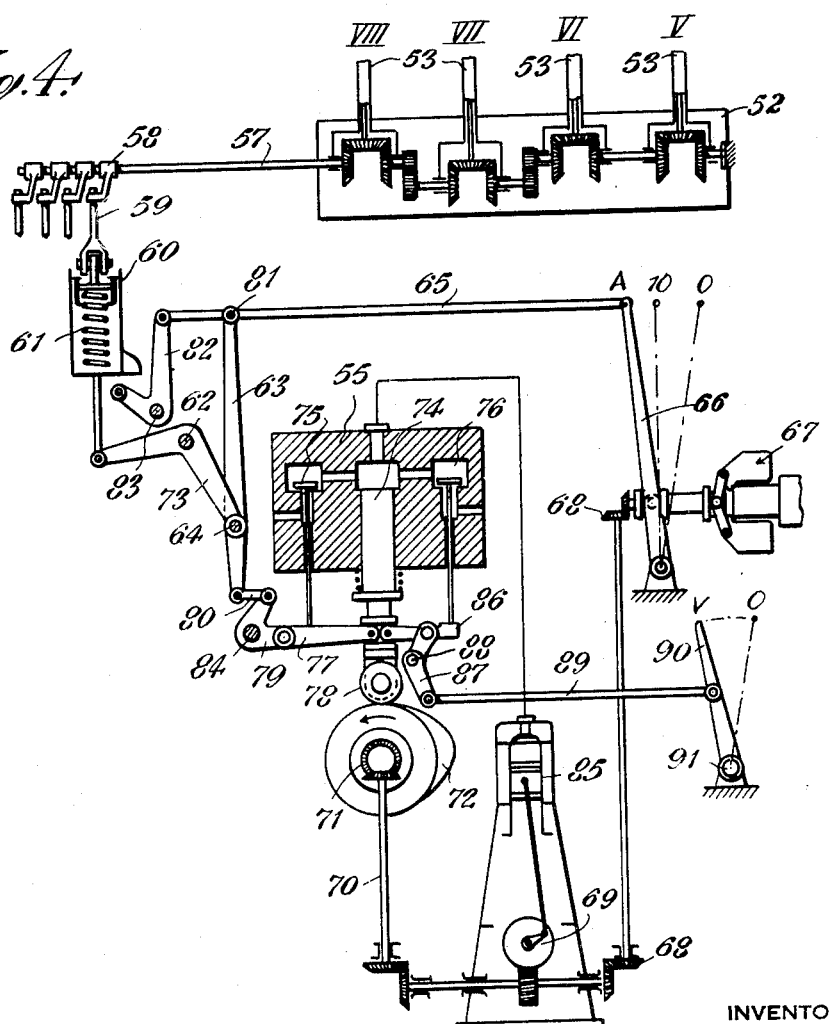
Fig. 4 is a side view of the apparatus of Fig. 3 shown in greater detail.

The ship's propulsion plant as shown in Fig. 3 has the sets V—VIII each consisting of an internal combustion engine and a generator, these sets each being electrically connected to the propulsion motors of the ship's propeller, not shown in the drawing, through an electric disconnecting switch 51. The switch members 53 arranged on the control desk 52 and positively connected to the disconnecting switches 51 are coupled to the fuel pumps and regulating members 55 provided for each of the engine sets V—VIII by means of transmission members 54. Instead of being arranged at each engine, the disconnecting switches 51 could be arranged on the control desk 52. The switch member 53 provided for each engine set V—VIII is coupled to a system of planet wheels as shown in Fig. 4, the shaft 57 of which system turns about a definite angle at each switch movement of the single levers 53, the actions of the four levers 53 being cumulative in any order. On the shaft 57 are the four cranks 58, which are each connected to the bell crank 73 through a rod 59 leading to the single sets V—VIII and a spring coupling 60 provided in this rod. The bell crank 73 is arranged on the pin 62 and has one of its arms linked to the lever 63 by means of the pin 64. The lever 63 is attached by means of the pin 81 to the rod 65, which is connected to the collar lever 66 of a centrifugal governor 67. This governor 67 is driven by the working shaft 69 of the engine sets V—VIII through a driving device 68. The left-hand end of the rod 65 is attached to the bell crank 82, which is mounted and can turn upon the pin 83. The one leg of the bell crank 82 extends below the spring coupling 60, which has a pressure spring 61, and prevents the actuation of the bell crank 73 through the rod 59 in certain positions of the governor 67.

The working shaft 69 drives the shaft 70 and camshaft 71, upon which are attached the cams 72 for driving the fuel pumps 55 for each combustion cylinder 85. Each fuel pump 55 is equipped with a pump plunger 74 and with an overflow valve 75 and a suction valve 76. The overflow valve 75 is controlled by the control lever 77, the one end of which is let in between the pump plunger 74 and the fuel pump roller 78 and the other end of which is linked to the bell crank 79 mounted on the pivot 84. The bell crank 79 is linked to the lever 63 through the rod 80. The suction valve 76 is controlled by the double-armed lever 86, the one end of which is let in between the fuel pump roller 78 and the pump plunger 74, while the other end of the control lever 86 controls the suction valve 76. The control lever 86 is linked to the bell crank 87, which is mounted on the pivot 88. The one end of the bell crank 87 is connected through a rod 89 to the hand lever 90 for the fuel, which lever is arranged so that it can be moved about the pin 91.

In order to explain the method of working of the marine propulsion plant shown in Figs. 3 and 4, it is assumed that the generators of the sets V—VIII running at part load are, by way of example, switched on to the electric driving motors of the propeller shaft and impart to the ship the speed ordered. The set VII is to be switched out from the other sets V, VI, VIII and to be used for feeding the general electric supply. For this purpose the disconnecting switch 51 belonging to the set VII is operated and the generator is switched out from the electric line, which leads to the electric driving motors. Thus the speed of engine VII is accelerated, since its fuel filling at first remains unchanged. The centrifugal governor 67 is set to a speed which is somewhat lower than the speed corresponding to the frequency of the general electric supply mains. As soon as the set VII, which now runs at increasing speed, has reached this particular set speed, the governor comes into action and moves the collar lever 66 out of its end position A towards O. Consequently the rod 65 is displaced to the right and turns the lever 63 clockwise about the pivot 64. The bell crank 79 moves counterclockwise and adjusts the control lever 77, so as to move the overflow valve 75 upwards. The end of delivery is thus moved nearer to the beginning of delivery, the angle of delivery at the cam 72 and thus the quantity injected are decreased. Through the actuation of the disconnecting switch 51 the switch lever 53 positively connected to this is moved over into its other end position, whereby a turning of the shaft 57 and a displacement downwards of the rod 59 are brought about. Through the governor 67, however, the bell crank 82 has been turned clockwise, so that its one end lies against the spring coupling 60, and the transmission of the movement from the rod 59 to the bell crank 73 is prevented. All movements made with the switch levers 53 of the sets V, VI, VIII can thus no longer be transmitted to the set VII. The hand-operated fuel lever 90 regulating the beginning of delivery of an injection is now brought into that prescribed position lying between V and O which guarantees the most favorable firing conditions for the speed corresponding to the frequency of the general electric supply. The governor 67 set to this speed brings about a corresponding correction of the end of delivery. The set VII can now be switched on to the electric mains. The regulation of the output of the set VII with maintenance of a constant speed is effected by the governor 67, exclusively through the action of this governor upon the overflow valve 75, which is opened sooner or later and consequently sets the end of delivery and injection at an earlier or later point in time.

Through the switching out of the set VII and the actuation of the lever 53 connected to the rod 59 of the sets V, VI and VIII is displaced downwards, As the engines V, VI and VIII are running at a speed which lies below the speed corresponding to the frequency of the electric mains, their governors 67 are in the position of rest, to which corresponds the position A of the collar lever 66 and the left-hand end position of the rod 65, in which positions a late end of delivery presents itself. The movement of the rod 59 is transmitted through the spring coupling 60 to the bell crank 73, which performs a rotary movement in a counterclockwise direction. This rotary movement brings about a turning of the lever 63 about the joint 81 in a counterclockwise direction, whereby a further lowering of the control lever 77 and thus a postponement of the end of delivery and injection are brought about. By the choice of a corresponding transmission ratio in the members 59, 73, 63, 79 for the transmission of movement, this postponement of the end of delivery can be chosen exactly great enough to correspond to the increased output made necessary in the sets V, VI, VIII by disengaging engine VII, if the speed ordered is to be maintained. With this starting position, which guarantees the most favorable service conditions, the regulation of output of the engines driving on the propellers can now be effected by the displacement between V and O of the fuel levers 90 influencing the beginning of delivery.

When the output requirement is suddenly diminished, for instance when the rotating propellers emerge from the water, the speed of the engines switched on to the working shaft rises. As soon as the speed reaches a value that can be set at the governor 67, for instance the speed which corresponds approximately to the frequency of the electric mains, the governor 67 comes into action and effects a movement of the collar lever 66 in a clockwise direction out of the position A towards O. In this way the overflow valve 75 is opened earlier through the rod 65 and the levers 63 and 79, and the end of delivery and injection occurs at an earlier point, so that there is a decrease in the quantity of fuel supplied to the combustion cylinders. If during such a phase of regulation the bell crank 82 comes to bear against the spring coupling 60, this coupling, by the compression of the spring 61 arranged in the spring coupling, can withdraw upwards, in this way turning the bell crank 73 clockwise, whereby a further diminution of the quantity of the fuel delivery comes about through the influence exerted on the overflow valve 75, and thus through the earlier setting of the end of delivery.

In case of tugs and ice-breakers, where the characteristic of the vessel's resistance is known to be subject to pronounced variations according to the size of the tug's load or the ice conditions prevailing, or in the case of marine propulsion plants in which long periods of travel astern are required, the solution to the problem here disclosed can also be applied. It is of advantage in this case for a further adjusting lever 23 or 53 independent on the switching-out device to be arranged besides the system of planet wheels 24, 56 on the shaft 26 or 57 by means of a planet wheel gear. Through the operation of this lever a uniform displacement of the end of delivery is effected in the fuel pumps 14 or 55 respectively of all the engines working on the propellers.

Instead of one single set, several sets can also be switched out from the propeller drive, either one after the other or simultaneously in groups, and in this case similar regulating actions to those in the examples described take place with regard to the regulation of the fuel quantity for the engines continuing to drive the propeller and for those switched out and used for other purposes.

The method proposed in the invention can be carried out in two or more engines or engine sets. The engines in question may be of the two-stroke or four-stroke type and may be run with or without supercharging. The engines might further be reversible, i. e., designed for running in both directions of rotation. In particular the propellers serving to propel ships or aircraft might be designed as variable pitch propellers which might be coupled to non-reversible driving or propelling engines.

In place of the fuel delivery pumps equipped with valves as shown, other known delivery pumps might be used and regulated according to the method proposed in the invention, as for instance pumps with sluice valves, with control edges and the like.

I claim:

1. A Diesel propulsion plant including a propeller member, two or more Diesel engines driving said propeller member, means to disconnect one or more of said engines from said propeller member and apparatus for regulating said engines which includes means for regulating the fuel injection pump of an engine connected to said propeller member so that the point in the working cycle of said connected engine at which fuel delivery by the pump ceases is retarded to an extent dependent upon the number of engines disconnected from said propeller member and means for regulating the output of said connected engine by adjusting the point in the working cycle of said connected engine at which fuel delivery by the pump begins.

2. A plant according to claim 1 which includes means by which the point in the working cycle of said connected engine at which fuel delivery by the pump begins is set automatically in accordance with the speed of said connected engine.

3. A plant according to claim 2 which includes additional means for setting the point in the working cycle of said connected engine at which fuel delivery by the pump begins manually at will.

4. A plant according to claim 1 which includes means for setting the point in the working cycle of said connected engine at which fuel delivery by the pump begins manually at will and means for superimposing on the manual setting of said point an adjustment depending upon the speed of said connected engine.

5. A plant according to claim 4 in which the means for superimposing an adjustment on the manual setting of the point in the working cycle of said connected engine at which fuel delivery by the pump begins serves to limit the advancement of this point when the speed of said connected engine exceeds a predetermined value.

6. A plant according to claim 1 which includes means by which the point in the working cycle of said connected engine at which fuel delivery by the pump begins can be set manually at will.

7. A Diesel propulsion plant including a propeller member, two or more Diesel engines driving said propeller member, means to disconnect one or more of said engines from said propeller member and apparatus for regulating said engines which includes means for regulating the fuel injection pump of an engine connected to said propeller member so that the point in the working cycle of that engine at which fuel delivery by the pump ceases is retarded to an extent dependent upon the number of engines disconnected from said propeller member in which means are provided whereby operation of the means to disconnect one or more of said engines from the propeller member retards the point in the working cycle of such engine or engines at which fuel delivery by the pump begins and further means are provided whereby the said operation also retards the point at which said fuel delivery ceases, and including control means for superimposing on the aforesaid adjustment of at least one of the said points a further adjustment for regulating the total quantity of fuel delivered to such engine or engines to produce a substantially constant engine speed.

8. A plant according to claim 7 in which means are provided to regulate the output of a disconnected engine by adjusting the point in the working cycle of that engine at which fuel delivery ceases.

9. A plant according to claim 7 in which means are provided to regulate the output of a disconnected engine by adjusting the point in the working cycle of that engine at which fuel delivery begins.

10. A plant according to claim 7 including additional means for adjusting the point in the working cycle of a connected engine at which fuel delivery ceases independently of the adjustment of this point in accordance with the number of disconnected engines.

HANS LIEBERHERR.

REFERENCES CITED

The following references are of record in the file of this patent:

UNITED STATES PATENTS

| Number | Name | Date |
| --- | --- | --- |
| 1,777,845 | Goldsmith | Oct. 7, 1930 |
| 1,790,221 | Banner | Jan. 27, 1931 |
| 1,804,328 | Dunham | May 5, 1931 |
| 1,847,950 | Kennedy, Jr. | Mar. 1, 1932 |
| 2,256,463 | Alexanderson | Sept. 23, 1941 |
| 2,283,431 | Gasser | May 19, 1942 |
| 2,370,078 | Schaelchlin et al. | Feb. 20, 1945 |
| 2,428,457 | Hines | Oct. 7, 1947 |